United States Patent
Dorfman et al.

(10) Patent No.: US 7,194,394 B2
(45) Date of Patent: Mar. 20, 2007

(54) METHOD AND APPARATUS FOR DETECTING AND CORRECTING INACCURACIES IN CURVE-FITTED MODELS

(75) Inventors: Barry Lee Dorfman, Austin, TX (US); Thomas Edward Rosser, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 09/999,141

(22) Filed: Nov. 15, 2001

(65) Prior Publication Data

US 2003/0093235 A1 May 15, 2003

(51) Int. Cl.
*G06G 7/48* (2006.01)

(52) U.S. Cl. .......... 703/3; 345/443; 345/442; 341/116; 342/359

(58) Field of Classification Search ............ 703/2; 345/443, 442; 700/61
See application file for complete search history.

(56) References Cited

U.S. PATENT DOCUMENTS

| 4,853,839 | A | * | 8/1989 | Nichols et al. ............. 700/61 |
| 5,373,457 | A | * | 12/1994 | George et al. ............... 703/2 |
| 5,566,292 | A | * | 10/1996 | Krembs .................... 345/442 |
| 5,581,679 | A | * | 12/1996 | Takahashi et al. .......... 345/442 |
| 5,793,380 | A | * | 8/1998 | Matsuno ................... 345/443 |
| 6,031,882 | A | * | 2/2000 | Enge et al. ................. 375/343 |
| 6,285,805 | B1 | * | 9/2001 | Gueziec ..................... 382/299 |
| 6,441,823 | B1 | * | 8/2002 | Ananya ..................... 345/442 |

OTHER PUBLICATIONS

Won Chung□□Automatic Curve Fitting Using an Adaptive Local Algorithm□□ACM Transactions on Mathematical Software, vol. 6, No. 1, Mar. 1980, pp. 45-57.*
Neil Weste, Kamran Eshraghian□□Principles of CMOS VLSI Design: a System Perspective, Second Edition, 1993□□Addison-Wesley Publishing Company.*

* cited by examiner

*Primary Examiner*—Kamini Shah
*Assistant Examiner*—Cuong Van Luu
(74) *Attorney, Agent, or Firm*—Duke W. Yee; Diana R. Gerhardt; Betty Formby

(57) ABSTRACT

A technique for detecting and correcting inaccuracies in curve-fitted models. Humps and dips in a curve-fitted model are identified. An analysis is performed on the humps and dips to determine if they are large enough to warrant correction. If so, then the source of the simulation and/or empirical data is modified to taking corrective action to improve the curve fit between the edge point and the next actual simulation and/or empirical data point.

21 Claims, 2 Drawing Sheets

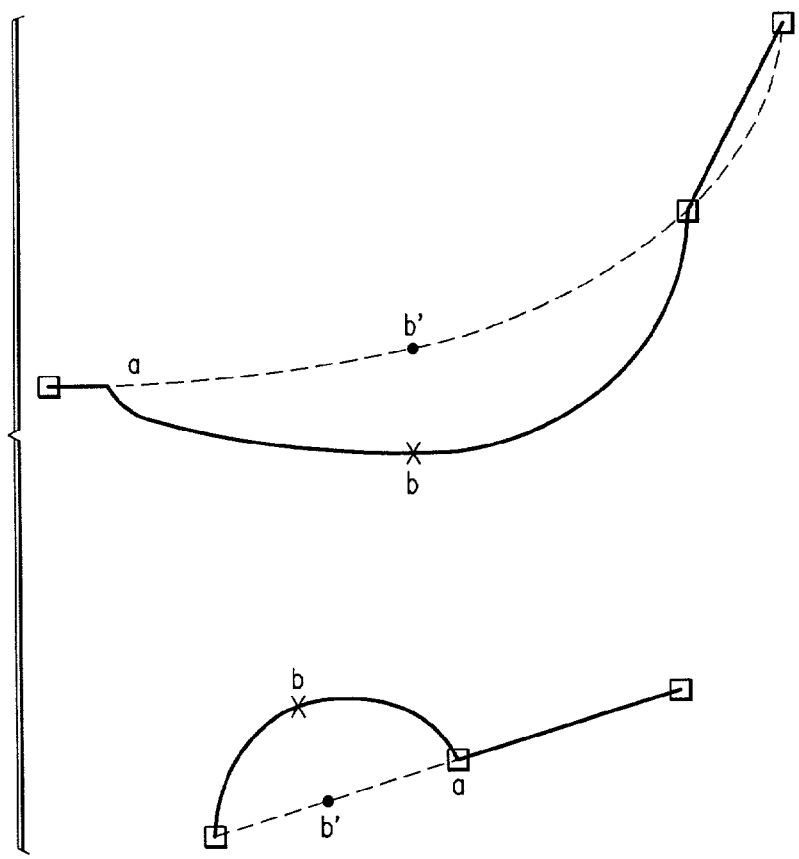
FIG. 2
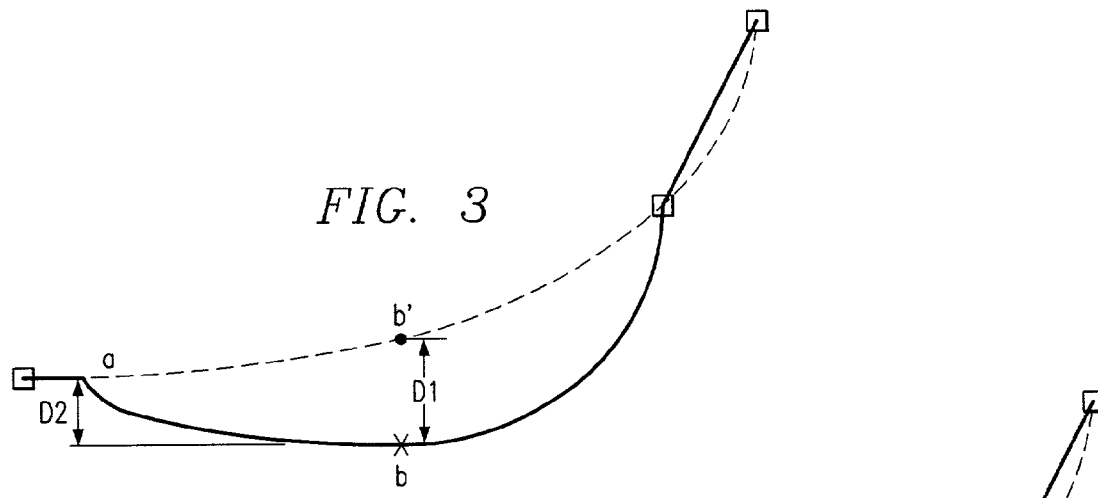
FIG. 3
FIG. 4

METHOD AND APPARATUS FOR DETECTING AND CORRECTING INACCURACIES IN CURVE-FITTED MODELS

BACKGROUND OF THE INVENTION

1. Technical Field

The present invention is directed to an improved data processing system and, in particular, an improved mechanism for detecting and correcting inaccuracies in curve fit models.

2. Description of Related Art

With simulation and empirical data, it is often beneficial to estimate the values of data at points not included in the actual simulation and empirical data, i.e. to extrapolate the data. In order to obtain an estimate of data at points not already known or determined, often curve fitting to the known data points is performed.

Curve fitting involves a number of steps to obtain the best curve fit to a particular set of data. First, a curve equation must be selected. Then, the coefficients for that equation must be determined. Thereafter, the equation using the current coefficients is tested against the simulation data or empirical data to see how well the equation represents the data at the actual simulation or empirical data points. The coefficients are then changed to improve the fit of the curve to the actual simulation or empirical data points. This process is then iterated until an acceptable fit is achieved.

The equation of a straight line is simple but normally does not match simulation or empirical data well. A higher order polynomial equation can make more twists and turns through the data points and therefore, makes a better fit to the actual simulation or empirical data points.

These higher order polynomials match well at the actual simulation or empirical data points, but may have large oscillations between the actual data points thereby generating humps or dips. These humps and dips do not generally occur in the actual simulation or empirical data and therefore, the humps and dips represent inaccuracies in the modeling of the simulation or empirical data even though the curve fits the actual simulation or empirical data. Therefore, it would be beneficial to have a method and apparatus for identifying these humps and dips and improving the modeling of the actual simulation or empirical data.

SUMMARY OF THE INVENTION

The present invention provides a method and apparatus for detecting and correcting inaccuracies in curve-fitted models of physical or simulation data. More specifically, the present invention provides a mechanism by which humps and dips in a curve fit of actual simulation and/or empirical data are identified. The present invention, after having identified the humps and dips, performs an analysis of the humps and dips to determine if they are large enough to warrant correction. References to "simulation" in this application are to illustrate a typical application (delay simulation of a circuit) and are for illustration purposes only.

Such a determination, in a preferred embodiment, involves taking an absolute value of a difference between a value at an edge point of the hump or dip and a value at the maximum or minimum point on the hump or dip, and comparing the absolute value of the difference to the value at the edge point. If the percentage difference (determined by the absolute difference divided by the value at the edge point) is greater than a threshold amount, then the hump or dip is determined to be large enough to require correction.

If the hump or dip is determined to be large enough to require correction, action must be taken to fix the problem. The specific action may be different for each process being modeled, and might include, for example, measuring more data points, changing the equation used to curve fit, modification of the coefficient choices, or the like. This process may be repeated for each hump or dip in the curve fit and may be iterated with each new set of simulation and/or empirical data generated.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is an exemplary diagram illustrating inaccuracies in curve fits to simulation data;

FIG. 3 is an exemplary diagram illustrating a method of evaluating whether a dip in a curve fit is large enough for correction;

FIG. 4 is an exemplary diagram illustrating a corrected curve fit generated based on the analysis performed by the present invention.

DETAILED DESCRIPTION OF THE PREFERRED EMBODIMENT

Figure 1:
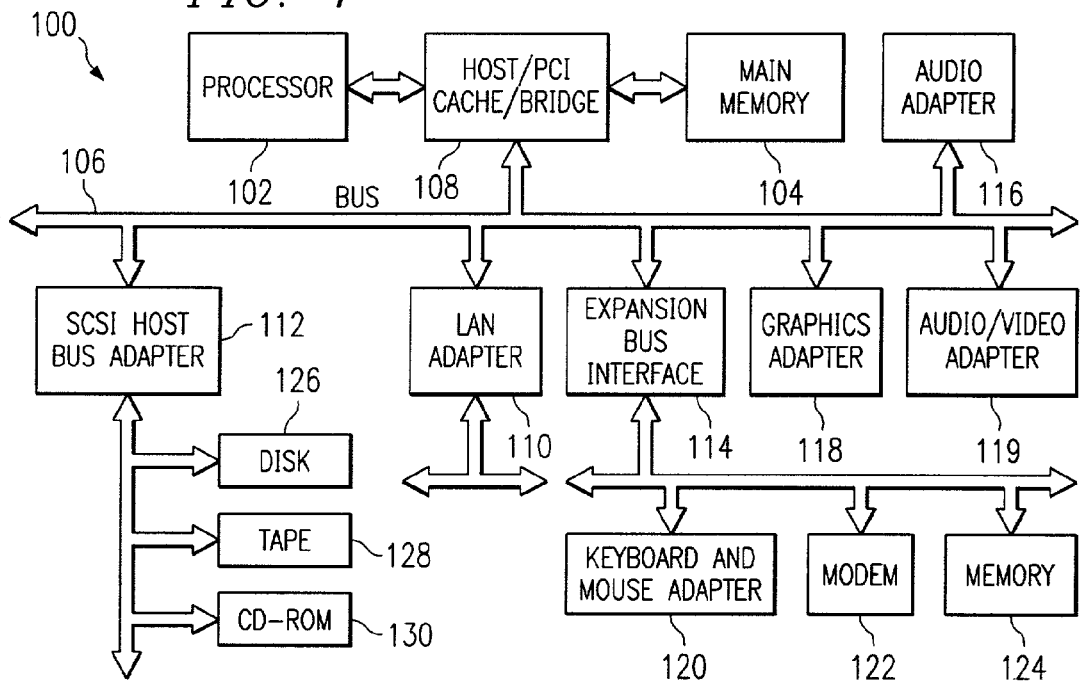
FIG. 1 is an exemplary block diagram of a data processing system in which the present invention may be implemented.

With reference now to the figures and in particular with reference to FIG. 1, a block diagram of a data processing system is shown in which the present invention may be implemented. Data processing system 100 is an example of a computer in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards.

In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows 2000, which is available from Microsoft Corporation. An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130, as noted by dotted line 132 in FIG. 1 denoting optional inclusion. In that case, the computer, to be properly called a client computer, must include some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a personal digital assistant (PDA), which is configured with ROM and/or flash ROM to provide non-volatile memory for storing operating system files and/or user-generated data.

The depicted example in FIG. 1 and above-described examples are not meant to imply architectural limitations. For example, data processing system 100 also may be a notebook computer or hand held computer in addition to taking the form of a PDA. Data processing system 100 also may be a kiosk or a Web appliance.

The processes of the present invention are performed by processor 102 using computer implemented instructions, which may be located in a memory such as, for example, main memory 104, memory 124, or in one or more peripheral devices 126–130.

The present invention provides a method and apparatus by which curve fitting of simulation and/or empirical data may be corrected for inaccuracies obtained due to the particular curve fit selected. Curve fitting is the process of creating an abstract model using measurements of physical circuits or processes. Curve fitting may further include the process of creating a higher-level abstract model from evaluations or simulations using a lower-level model of a physical circuit, process or phenomena.

In a preferred embodiment, the present invention is implemented as computer executed instructions on a computing device such as that shown in FIG. 1. However, it should be appreciated that the present invention may be implemented as hardware, software, or a combination of hardware and software, without departing from the spirit and scope of the present invention.

The present invention may be applied to any simulation and/or empirical data set. In a preferred embodiment, the simulation and/or empirical data represents the physical characteristics of a subject of the simulation and/or observation. The types of simulation and/or observation with which the present invention may be used are too numerous to list here. Some examples include, a decay of a physical object, a movement of an object, friction on an object, lift of an airfoil, drag on an airfoil, circuit characteristics, and the like. In a preferred embodiment, the present invention is used to correct inaccuracies in curve fits of circuit delay simulation and/or empirical data for a circuit.

FIG. 2 illustrates how inaccuracies may be generated through curve fitting to simulation/empirical data. For purposes of the present description, the preferred embodiment will be described in terms of circuit delay simulation data, however the present invention is not limited to such.

In FIG. 2, simulation data points, i.e. Data points obtained through running a simulation of the circuit, are shown as boxes. The point "a" represents an edge of a hump or dip in the curve fit. The point "b" represents a local minima/maxima of the dip/hump. The point "b'" represents the correct simulation data point at the x value of the local minima/maxima if one were to be measured at that x value.

As shown in FIG. 2, the curve fit to the simulation data may fit the simulation data at each data point (represented as boxes), but is not accurate with regard to points between simulation data points. For example, as shown in FIG. 2, the curve fit, which is shown as a solid line, generates a point "b" at the maxima or minima of the hump/dip (in the particular example shown, point "b" is the maxima of the hump). If the simulation were to be performed for that x value, the actual data point turns out to be at the location represented by "b'". Thus, there is an error due to the curve fit that may be quantified by the difference between "b" and "b'". The present invention is aimed at reducing the amount of error between such points and thereby generating a more accurate curve fit.

The first step in correcting inaccuracies in curve fits of simulation data is to identify the areas requiring correction. The inaccuracies in a curve fit are typically identified by way of humps and dips in the curve fit. Humps and dips may be identified by points at which the slope of the curve is positive on one side of the point and negative on the other side of the point. Thereby, the point is also the local maxima or minima of the hump/dip.

The equation of the curve fit can be solved to identify these points. For example, the curve fit equation can be evaluated at points whose spacing is successively decreased within the appropriate range, such as with a binary search technique, to find the point at which the slope is nearest zero.

This same technique can be used to identify the edge of the hump or dip. The edge points "a" of the hump/dip are crossover points between terms in the polynomial curve fit equation. The point "a" is determined by the point at which the slope of the curve changes from positive to negative or vice versa. This point could also be determined by any significant change in slope (e.g. changing from 10 to 1) while the point "b" could be determined as the midpoint between the hump/dip edges if a minima/maxima is not obvious. The next measured data point (higher or lower) is always the bound for the hump/dip edge point Turning to FIG. 3, once the dips and humps are identified, their size is determined in order to determine whether they are of sufficient size to warrant correction. In other words, a determination is made as to the magnitude of the error between the data points obtained from the curve fit and the expected simulation data points. The magnitude of the error may be defined as the absolute value of the difference between a local maxima/minima of the hump/dip and the actual simulation data point if one were to be generated at the x value of the local maxima/minima. In equation form, this definition looks like:

$$D1 = abs(b-b')$$

which is the actual size of the error due to the curve fit. However, the correct value at point b' is not known without doing additional circuit simulations. Therefore, an approximation of this error is obtained by taking the absolute value of the difference between an edge point of the hump/dip and the maxima/minima. In equation form this difference looks like:

$$D2 = abs(Y(a) - Y(b))$$

where Y(a) and Y(b) are the Y values of the curve evaluated at "a" and "b". This is a reasonable estimate of the size of the actual error. It should be noted that, because it may be assumed that the curve-fit is "well behaved," meaning that there are no discontinuities, an upper limit to D2 is established by the value of D1. That is, the absolute difference between b and b' will always be greater than the absolute difference between b and a (with the exception of a horizontal line where the two absolute values of the differences will be equal).

By comparing the value of D2 to the value at the edge point "a", a relative error can be determined:

$$E2 = D2/Y(a)$$

If this relative error is large enough, the hump or dip is significant enough to warrant correction. The significance of the hump or dip may be measured relative to a threshold, for example. In a preferred embodiment, if the relative error is equal to or greater than 3%, the hump/dip is determined to be of such significance as to warrant correction. Of course the particular threshold chosen will depend on the type of simulation/empirical data to which curve fitting is being applied.

After having determined whether or not the hump/dip is significant, correction is applied. The easiest way to correct the curve fit is to instruct the simulation to generate one or more additional data points in the range between the edge points of the hump/dip. By doing so, the curve fit is enticed to more accurately model the point b' and thereby reduce the error between the curve fit and the actual simulation data. With empirical data, such a correction may involve instructing a human to take additional measurements within a range of measurements, or the like. This process may be repeated for each hump/dip encountered in the curve fit.

FIG. 4 illustrates a curve fit after evaluation by the present invention. As shown in FIG. 4, an additional simulation data point "add" is generated between an edge point "a" and a previously known simulation data point "c" at the other edge of the dip. The additional simulation data point causes the curve fit to more closely resemble the actual simulation data curve, as represented by the dotted line. The process of the present invention may be performed iteratively in order to obtain closer approximations to the actual simulation data curve.

Figure 5:
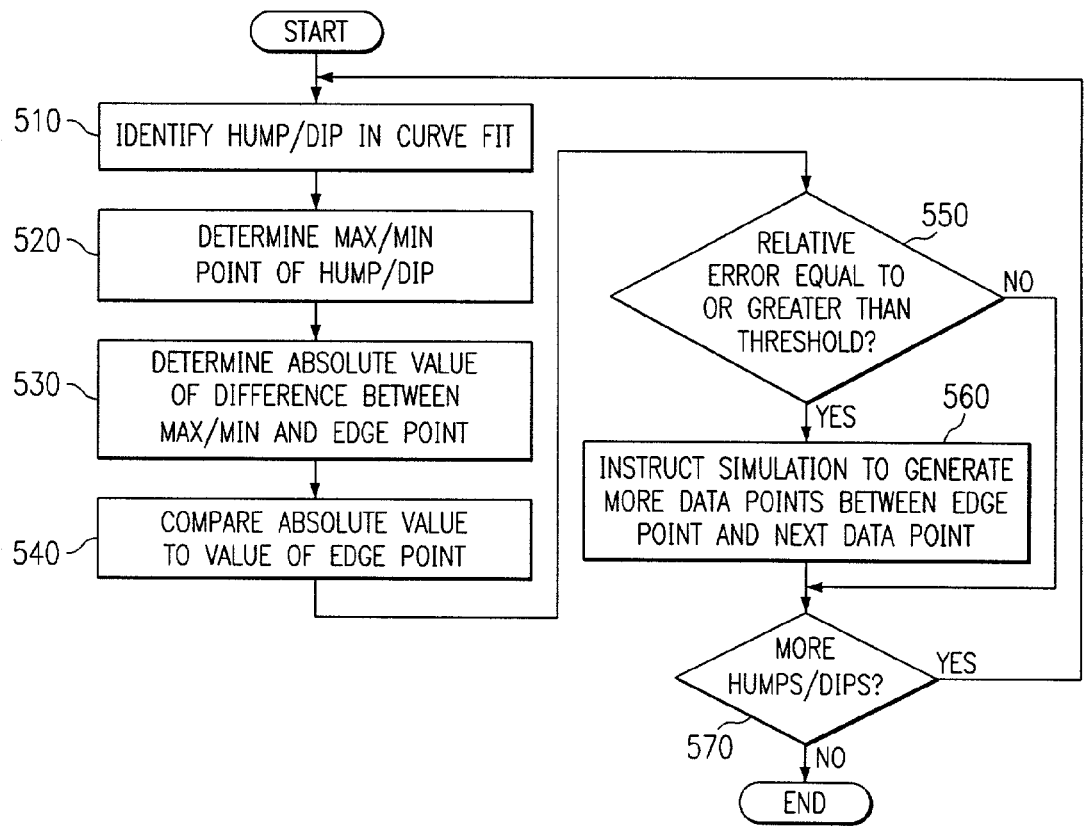
FIG. 5 is a flowchart outlining an exemplary operation of the present invention.

FIG. 5 is a flowchart outlining an exemplary operation of the present invention. As shown in FIG. 5 the operation starts with identifying a hump/dip in a curve fit of simulation/empirical data (step 510). The local maxima/minima of the hump/dip is then determined (step 520) and an absolute value of the difference between the Y-component of the maxima/minima and the Y-component of an edge point of the hump/dip is calculated (step 530). The absolute value of the difference is then compared to the value of the Y-component of the edge point (step 540).

A determination is then made as to whether the relative error obtained from the comparison is equal to or greater than a threshold amount (step 550). If so, the simulation (or human operator in the case of empirical data) is instructed to generate an additional one or more data points between the edge point and the next known simulation data point (step 560). Thereafter, or if the relative error is less than the threshold, a determination is made as to whether there are additional humps/dips in the curve fit that are in need of evaluation (step 570). If so, the operation returns to step 510 and is executed using the next hump/dip in the curve fit. Otherwise, the operation ends.

As previously mentioned, one preferred area in which the present invention may be applied is in the area of circuit simulation. With the present invention, a circuit simulation may be run to thereby generate simulation data identifying one or more physical characteristics of the operation of the circuit. For example, this simulation data may represent circuit delay information.

A curve fitting algorithm may then be run on the simulation data to thereby generate a curve fit to approximate data points between actual simulation data points. The curve fit may then be evaluated using the tools of the present invention to determine how well the curve fit approximates the actual simulation data if such simulation data were to be generated for points between the actual simulation data points. Based on this evaluation by the present invention, the circuit simulation may then be instructed to generate one or more additional data points in areas where inaccuracies are identified, such as humps or dips in the curve fit. The simulation may then be rerun to generate these additional data points and the evaluation by the present invention performed again in an iterative manner.

Thus, the present invention provides a mechanism by which inaccuracies in curve fits to simulation/empirical data may be identified and corrected. The present invention provides guidance as to where a curve fit needs to be made more representative of the actual simulation/empirical data and thus, minimizes the possibility of use of the curve fit to generate erroneous modeling results.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of removing inaccuracies in curve fits of data representing a physical characteristic of a subject, comprising:
   identifying a hump or dip in a curve fit of the data;
   determining a relative error E2 based on a size of the hump or dip, including
      calculating a difference D2 equal to an absolute value of a difference between Y(a) and Y(b), where Y(a) is the value along the y axis of an edge point of the hump or dip and Y(b) is the value along the y axis of a local maxima or minima for the hump or dip, and calculating E2 equal to D2 divided by Y(a);
   determining if the relative error E2 is equal to or greater than a threshold;
   modifying the curve fit of the data in response to determining that the relative error is equal to or greater than the threshold; and
   estimating the physical characteristic of the subject using the modified curve fit of the data.

2. The computer-implemented method of claim 1, wherein identifying the hump or dip in a curve fit includes identifying points on the curve fit where there is a positive to negative discontinuity or a negative to positive discontinuity in slope.

3. The computer-implemented method of 1, wherein the threshold is approximately three percent.

4. The computer-implemented method of claim 1, wherein the subject is a circuit.

5. The computer-implemented method of claim 1, wherein the data is one of simulation data and empirical data.

6. The computer-implemented method of claim 1, wherein modifying the curve fit of the data includes generating one or more additional data points of the data in a range identified by the hump or dip.

7. An apparatus for removing inaccuracies in curve fits of data representing a physical characteristic of a subject, comprising:
   a processor connected to a memory and configured to execute instructions stored in the memory;
   instructions for identifying a hump or dip in a curve fit of the data;
   instructions for determining a relative error E2 based on a size of the hump or dip, the instructions for determining E2 including
      calculating a difference D2 equal to an absolute value of a difference between Y(a) and Y(b), where Y(a) is the value along the v axis of an edge point of the hump or dip and Y(b) is the value along the y axis of a local maxima or minima for the hump or dip, and calculating E2 equal to D2 divided by Y(a);
   instructions for determining if the relative error E2 is equal to or greater than a threshold;
   instructions for modifying the curve fit of the data in response to determining that the relative error is equal to or greater than the threshold; and
   instructions for estimating the physical characteristic of the subject using the modified curve fit of the data.

8. The apparatus of claim 7, wherein the instructions for identifying the hump or dip in a curve fit includes instructions for identifying points on the curve fit where there is a positive to negative discontinuity or a negative to positive discontinuity in slope.

9. The apparatus of 7, wherein the threshold is approximately three percent.

10. The apparatus of claim 7, wherein the subject is a circuit.

11. The apparatus of claim 7, wherein the data is one of simulation data and empirical data.

12. The apparatus of claim 7, wherein the instructions for modifying the curve fit of the data includes instructions for generating one or more additional data points of the data in a range identified by the hump or dip.

13. A computer-readable, recordable-type media containing a computer program product for removing inaccuracies in curve fits of data representing a physical characteristic of a subject, comprising:
   first instructions for identifying a hump or dip in a curve fit of the data;
   second instructions for determining a relative error E2 based on a size of the hump or dip, said second instructions including
      calculating a difference D2 equal to an absolute value of a difference between Y(a) and Y(b), where Y(a) is the value along they axis of an edge point of the hump or dip and Y(b) is the value along the y axis of a local maxima or minima for the hump or dip, and calculating E2 equal to D2 divided by Y(a);
   third instructions for determining if the relative error is equal to or greater than a threshold;
   fourth instructions for modifying the curve fit of the data in response to determining that the relative error is equal to or greater than the threshold; and
   fifth instructions for estimating the physical characteristic of the subject using the modified curve fit of the data.

14. The computer-readable, recordable-type media of claim 13, wherein the first instructions for identifying humps or dips in a curve fit include instructions for identifying points on the curve fit where there is a positive to negative discontinuity or a negative to positive discontinuity in slope.

15. The computer-readable, recordable-type media of claim 13, wherein the threshold is three percent.

16. The computer-readable, recordable-type media of claim 13, wherein the subject is a circuit.

17. The computer-readable, recordable-type media of claim 13, wherein the data is one of simulation data and empirical data.

18. The computer-readable, recordable-type media of claim 13, wherein the third instructions for modifying the curve fit of the data include instructions for generating one or more additional data points of the data in a range identified by the hump or dip.

19. A computer-implemented method of removing inaccuracies in a curve fit of simulation data obtained from a simulation of an operation of a circuit, comprising:
   identifying an area of inaccuracy in modeling the circuit due to the curve fit by determining a local maxima point in the curve fit and an edge point of a hump associated with the local maxima point;
   calculating a relative error E2 for the area of inaccuracy by the steps of
      calculating a difference D2 equal to an absolute value of a difference between Y(a) and Y(b), where Y(a) is the value along the y axis of the edge point of the hump and Y(b) is the value along the y axis of the local maxima point, and calculating E2 equal to D2 divided by Y(a)

determining if the relative error E2 is equal to or greater than a predetermined threshold; and modifying the curve fit in response to determining that the relative error E2 is equal to or greater than the predetermined threshold, wherein modifying the curve fit includes further circuit simulation to generate one or more additional data points of the simulation data in a range identified by the area of inaccuracy.

20. A computer-implemented method of removing inaccuracies in a curve fit of simulation data obtained from a simulation of an operation of a circuit, comprising:

identifying an area of inaccuracy in modeling the circuit due to the curve fit by locating a hump or dip in the curve fit;

determining if the relative error E2 in the area of inaccuracy is equal to or greater than a predetermined threshold; and modifying the curve fit in response to determining that E2 is equal to or greater than the predetermined threshold, wherein determining if E2 is equal to or greater than a threshold includes calculating D2 equal to an absolute value of a difference between Y(a) and Y(b) where Y(a) is the value along the y axis of an edge point of the hump or dip and Y(b) is the value along they axis of a local maxima or minima, and then calculating E2 equal to D2 divided by Y(a).

21. A computer-implemented method of simulating an operation of a circuit, comprising:

performing a simulation of the circuit to thereby generate simulation data;

recursively performing a curve fit on the simulation data to create a best polynomial curve fit;

determining a first point that is either a local maxima point or a local minima point in the best polynomial curve fit by identifying where there is a positive to negative discontinuity or a negative to positive discontinuity in slope;

determining an edge point of a hump or dip associated with the first point;

using said first point and said edge point, determining a difference D2 equal to an absolute value of a difference between Y(a) and Y(b), where Y(a) is the value along the y axis of said edge point and Y(b) is the value along they axis of said first point;

determining a relative error E2 equal to D2 divided by Y(a); and modifying the best polynomial curve fit at the first point in response to determining that E2 is equal to or greater than a predetermined threshold.

* * * * *